(12) United States Patent
Kramer (10) Patent No.: US 10,145,360 B2
(45) Date of Patent: Dec. 4, 2018

(54) METHOD FOR MONITORING THE OPERATION OF A WIND ENERGY PLANT AND WIND ENERGY PLANT

(71) Applicant: SENVION GMBH, Hamburg (DE)

(72) Inventor: Bertin Kramer, Osnabrück (DE)

(73) Assignee: Senvion GmbH, Hamburg (DE)

( * ) Notice: Subject to any disclaimer, the term of this patent is extended or adjusted under 35 U.S.C. 154(b) by 533 days.

(21) Appl. No.: 14/822,372

(22) Filed: Aug. 10, 2015

(65) Prior Publication Data

US 2015/0345467 A1   Dec. 3, 2015

Related U.S. Application Data

(63) Continuation of application No. PCT/EP2014/000149, filed on Jan. 21, 2014.

(30) Foreign Application Priority Data

Feb. 12, 2013  (DE) .................. 10 2013 202 261

(51) Int. Cl.
*F03D 7/02* (2006.01)
*F03D 7/04* (2006.01)
(Continued)

(52) U.S. Cl.
CPC .......... *F03D 7/0224* (2013.01); *F03D 7/0296* (2013.01); *F03D 7/045* (2013.01);
(Continued)

(58) Field of Classification Search
CPC ...... F03D 7/0224; F03D 7/0296; F03D 80/40; F03D 17/00; F03D 7/045; Y02E 10/721;
(Continued)

(56) References Cited

U.S. PATENT DOCUMENTS

2009/0039650 A1*  2/2009  Nies ................... G05B 23/0229
                                                              290/44
2010/0268395 A1   10/2010 Ingemann et al.
(Continued)

FOREIGN PATENT DOCUMENTS

DE          10065314 A1    7/2002
DE       102005017054 A1    3/2006
(Continued)

OTHER PUBLICATIONS

Osgood, Dynamic Characterization Testing of Wind Turbines, May 2001, NREL, pp. 1-2, 9.*
(Continued)

*Primary Examiner* — Jason Shanske
*Assistant Examiner* — Jesse Prager
(74) *Attorney, Agent, or Firm* — Rankin, Hill & Clark LLP (57) ABSTRACT

A method for monitoring the operation of a wind energy plant having at least one blade angle adjustable rotor blade. Rotor blade vibrations are registered during operation by at least one measuring device, and at least one current natural frequency is established from the registered vibrations. At least one environmental parameter and/or at least one operational parameter, which influence the natural frequency of the rotor blade, is or are additionally registered. At least one natural frequency expected value dependent on the additionally registered parameter(s) and at least one confidence interval are calculated for the at least one established current natural frequency of the rotor blade, and whether the established current natural frequency lies within, or outside of, the confidence interval around the natural frequency expected value is monitored. Also disclosed is an operational control apparatus of a wind energy plant and a corresponding wind energy plant.

14 Claims, 3 Drawing Sheets

(51) Int. Cl.
*F03D 17/00* (2016.01)
*F03D 80/40* (2016.01)

(52) U.S. Cl.
CPC ............. *F03D 17/00* (2016.05); *F03D 80/40* (2016.05); *F05B 2260/84* (2013.01); *F05B 2270/303* (2013.01); *F05B 2270/32* (2013.01); *F05B 2270/325* (2013.01); *F05B 2270/327* (2013.01); *F05B 2270/328* (2013.01); *F05B 2270/334* (2013.01); *F05B 2270/335* (2013.01); *F05B 2270/808* (2013.01); *Y02E 10/721* (2013.01); *Y02E 10/723* (2013.01)

(58) Field of Classification Search
CPC ............. Y02E 10/723; F05B 2270/303; F05B 2270/32; F05B 2270/327; F05B 2270/328; F05B 2270/335; F05B 2260/84; F05B 2270/224; F05B 2270/334; F05B 2270/325; F05B 2270/808
See application file for complete search history.

(56) References Cited

U.S. PATENT DOCUMENTS

2010/0332272 A1  12/2010  Ong et al.
2012/0053851 A1*  3/2012  Bailer .................. F03D 1/0658
                                                          702/34
2012/0253697 A1  10/2012  Frankenstein et al.
2013/0287568 A1*  10/2013  Miranda ............. F03D 7/0224
                                                          416/1

FOREIGN PATENT DOCUMENTS

| EP | 2511524 A1 | 10/2012 | |
|---|---|---|---|
| EP | 2565444 A1 | 3/2013 | |
| WO | 2006/012827 A1 | 2/2006 | |
| WO | 2011/029926 A1 | 3/2011 | |
| WO | WO 2011127990 A2 * | 10/2011 | ............. F03D 7/042 |
| WO | 2012/000509 A2 | 1/2012 | |

OTHER PUBLICATIONS

Cross et al.; "Cointegration and why it works for SHM"; Modern Practice in Stress and Vibration Analysis 2012; Journal of Physics: Conference Series 382 (2012) 012046.

Jeffries et al.; "Experience with bicoherence of electrical power for condition monitoring of wind turbine blades"; Vision, Image and Signal Processing, IEE Proceedings—. IET, 1998, pp. 141-148.

International Search Report dated Apr. 4, 2014 in corresponding International Patent Application No. PCT/EP2014/000149.

* cited by examiner

METHOD FOR MONITORING THE OPERATION OF A WIND ENERGY PLANT AND WIND ENERGY PLANT

CROSS-REFERENCE TO RELATED APPLICATIONS

This application is a continuation of International Application No. PCT/EP2014/000149, filed Jan. 21, 2014, and claims priority to German Pat. App. No. 10 2013 202 261.1, filed Feb. 12, 2013.

BACKGROUND OF INVENTION

Field of Invention

The invention relates to a method for monitoring the operation of a wind energy plant comprising a tower, a nacelle arranged on the tower and a rotor, which has at least one blade angle adjustable rotor blade, wherein rotor blade vibrations of the at least one rotor blade are registered during the operation of the wind energy plant by means of at least one measuring device and at least one current natural frequency of the at least one rotor blade is established from the registered rotor blade vibrations, wherein at least one environmental parameter and/or at least one operational parameter is or are additionally registered, which parameter or parameters influences or influence the natural frequency of the at least one rotor blade. The invention furthermore relates to an operational control apparatus of a wind energy plant and a corresponding wind energy plant. The present invention relates in particular to monitoring the state of rotor blades of a wind energy plant.

Brief Description of Related Art

The rotor blades are amongst the components of a wind energy plant under the highest amount of strain during the operation thereof. The rotor blades are exposed to the wind and transfer the energy stored in the wind into a rotational movement, while being exposed to large shearing forces, bending forces, centrifugal forces, turbulence, changes of load, etc. Additionally, the rotor blades are also exposed to environmental influences such as solar radiation, rain, snow and ice accretion.

Although the rotor blades should be designed for high service life, they should also be as light as possible so as to operate a wind energy plant economically. In the design thereof, the aerodynamics, the occurring loads, the dynamics of operation, the possibility of closed-loop control and management, as well as the material should be taken into account. Here, inter alia, safety aspects include imbalances, resonances, dropping ice and material fatigue, which can likewise occur in rotor blades. In view of the efficiency, it is particularly the energy production related to the site and, accompanying this, wind measurements as well as the highest possible service life of the rotor blades that should be taken into account for the rotor blades.

Since the rotor blades may not be dimensioned too thick for reasons of efficiency, it is desirable to monitor the rotor blades during operation in order to ensure that measures can be adopted for reducing loads in the case of increased loads which go beyond the loads underlying the design of the rotor blades. An example for this lies in the use of the monitoring for identifying ice accretion on the rotor blades; this is desirable at many sites with a relatively cold climate. Ice accretion may already form at temperatures below 3° C. and, firstly, as additional mass, puts a strain on the rotor blades and, secondly, as a source for ice droppings, is a danger to humans, animals and objects over a large area.

A method and device for monitoring the state of rotor blades on wind power plants is known from DE 10 2005 017 054 A1. There, the state of rotor blades is monitored by way of measuring body-borne sound of at least one rotor blade using at least one sensor fastened to the rotor blade, which sensor is connected to a unit for wireless transmission of the output signals of the sensors to an evaluation unit, where a frequency spectrum is established from the signals by means of suitable methods, the frequency spectrum is compared to reference spectra which are stored in the evaluation unit, correspond to defined damage and extraordinary states and are parameterized, and the state of the rotor blade is established therefrom. Here, a body-borne sound measurement is brought about from a sequence of a plurality of individual measurements carried out immediately in succession, wherein the start of each one of these individual measurements is triggered by a uniform rotational angle of the rotor blade in relation to the rotational axis of the rotor, and all established frequency spectra of each individual measurement are accumulated prior to the comparison with the reference spectra.

By triggering by the uniform rotational angle, it is possible to establish not only the amplitude profile of the frequency spectrum but also the phase angle thereof. The measurements are performed with a high repetition rate or sampling rate in order to capture the harmonic spectrum. The amplitudes and phases of the individual harmonics of the fundamental waves (natural frequencies) of the rotor blade are converted into a vector which is then compared by means of suitable statistical methods to vectors of the frequency spectra for various damage cases in order to determine the similarity with known damage cases. Since this method is employable in a versatile fashion and very powerful, it requires an additional system which must be introduced into a wind energy plant.

By contrast, the present invention is based on the object of providing monitoring of the operation of a wind energy plant, in particular in relation to ice accretion or other damage cases, which ensures a reliable operation of the wind energy plant with little outlay.

BRIEF SUMMARY OF THE INVENTION

This object is achieved by a method for monitoring the operation of a wind energy plant comprising a tower, a nacelle arranged on the tower and a rotor, which has at least one blade angle adjustable rotor blade, wherein rotor blade vibrations of the at least one rotor blade are registered during the operation of the wind energy plant by means of at least one measuring device and at least one current natural frequency of the at least one rotor blade is established from the registered rotor blade vibrations, wherein at least one environmental parameter and/or at least one operational parameter is or are additionally registered, which parameter or parameters influences or influence the at least one natural frequency of the at least one rotor blade, which method is developed in that at least one natural frequency expected value dependent on the additionally registered environmental parameter(s) and/or operational parameter(s) and at least one confidence interval are calculated for the at least one established current natural frequency of the at least one rotor blade, wherein there is monitoring as to whether the established current natural frequency lies within, or outside of, the confidence interval around the natural frequency expected value.

As a result, the method according to the invention constitutes a particularly simple and reliable method for identifying exceptional cases of operation, such as e.g. ice accretion at the rotor blades. To this end, at least one natural frequency of the rotor blade is monitored, as is already partly the case in the prior art. By way of example, it is also possible to monitor two to four natural frequencies, for example respectively the first and/or second natural frequency in the rotational direction and/or impact direction. To this end, the time profile of rotor blade vibrations is registered by means of a measuring device and a current natural frequency of the rotor blade is established from the registered rotor blade vibrations. This can be brought about by, for example, a Fourier transform, in particular a Fast Fourier Transform (FFT), by a wavelet analysis or by other suitable known methods and by a subsequent identification of maxima in the frequency spectrum.

However, unlike in the prior art, it is not necessary to register a whole harmonic spectrum. Dispensing therewith already significantly simplifies the method by reducing the sampling rate. Hence, since the fundamental frequencies of the natural frequencies of rotor blades usually lie in the region of one to a few Hz, it is therefore sufficient to register the vibrations with a comparatively low sampling rate. Thus, in principle, a sampling rate of only 20 Hz already renders it possible to cover the frequency spectrum up to 10 Hz, in which the fundamental vibrations or first natural frequencies and possibly the second natural frequencies are usually situated. A sampling rate of up to 50 Hz is advantageous for improving the accuracy. Therefore, compared to the method known from DE 10 2005 017 054 A1, in which sampling rates of up to 1000 Hz are necessary for registering harmonic spectra, this results in a significant reduction in the outlay and in the required processing speed.

In contrast to the aforementioned prior art in accordance with DE 10 2005 017 054 A1, it is now no longer necessary either to keep an arsenal of reference spectra available, parameterize these into vectors and perform a similarity analysis, but rather, according to the invention, it is sufficient for an expected value to be formed as a function of environmental parameters and/or operational parameters of the wind energy plant and for the measured natural frequencies to be compared to this expected value. According to the invention, the expected value depends on environmental parameters and/or operational parameters. The computational outlay and the outlay in relation to the available memory are therefore significantly reduced compared to the known method.

Preferably, the at least one confidence interval being exceeded is reported to an Operation Control System of the wind energy plant. Here, the confidence interval being exceeded means that the magnitude of the difference between the established current natural frequency and the expected value is greater than the confidence interval. This can mean both that an upper limit is overshot and that a lower limit is undershot, wherein the limits are formed by the confidence interval around the expected value. Such a report can preferably be an ice warning or an ice report, particularly if a lower limit is undershot. In this case, the plant should either be shut down or put into operation with reduced power, in which the rotor blades and the whole wind energy plant can still be operated safely, even in the case of e.g. ice accretion.

The vibrations of the at least one rotor blade are preferably registered by means of a sensor system stationary in relation to the rotor, in particular in relation to the rotor blade, which sensor system in particular comprises acceleration sensors, deformation sensors and/or strain sensors. Corresponding strain senses are preferably arranged in the rotor blade root or at the rotor blade root. Advantageous suitable sensors are optical waveguides with fiber Bragg gratings (FBG). Strain gauges or acoustic sensors, which undertake a body-borne sound measurement, are also suitable within the scope of the present invention.

A rotor speed, a generator speed or a parameter connected therewith is preferably registered as operational parameter. The speed-dependent centrifugal forces have a noticeable influence on the natural frequencies. A higher rotor speed leads to stiffening, as in the case of a tensioned string, which leads to an increase in the natural frequency.

Preferably, as an alternative or in addition thereto, a temperature and/or a wind speed is or are registered as environmental parameter and/or a rotor blade angle and/or a generated power is and/or are registered as operational parameter. These parameters directly or indirectly have an influence on the vibration property of the monitored rotor blade and/or are correlated therewith. Thus, the material of the rotor blade stiffens when the temperature drops, leading to an increase in Young's modulus and hence in the natural vibration frequency. The rotor blade angle modifies the alignment of the rotor blade in relation to the rotor plane and hence the vibration-technical link to the whole system by changing the clamping condition such that the rotor blade angle also influences the fundamental frequency or the natural frequency or natural frequencies of the rotor blade.

The generated power is also a factor correlating with the natural frequency since both the speed and the rotor blade angles change in the partial load range and in the full load range of the wind energy plant and the load on the rotor blades increases with increasing wind speed and said rotor blades are bent out of the rotor plane. Prevalent wind speed is also correlated to the natural frequency or the natural frequencies, in particular by way of the generated power, the speed and the pitch angle.

Within the scope of the invention, the speed can be both the speed of the rotor and the speed of the generator, particularly in the case of wind energy plants in which the rotor is connected to the generator by way of a gearbox. Such a gearbox generally has a fixed transmission, and so the rotor speed and the gearbox speed are fixedly linked to one another.

Preferably, a function underlying the at least one natural frequency expected value is adaptable to a current turbine configuration by means of statistical evaluation of measurement data. Within the scope of the invention, this means that the at least one natural frequency expected value or the at least one generating function can be adapted to a current turbine configuration and it is not set once and for all at the start of the operation of a wind energy plant. The current configuration can experience structural modifications or e.g. signs of aging at components such as rotor blades. These can lead to a gradual change in the monitored natural frequencies that should be considered during monitoring over the scope of the service life of a wind energy plant. To this end it is possible, for example, to monitor whether the measurement values for the natural frequency of the rotor blade lie systematically above or below the expected value. If this occurs during normal operation without a fault being displayed, the function generating the expected value is adapted to the current conditions or the current turbine configuration.

In an advantageous simple embodiment, the at least one natural frequency expected value is calculated as a result of a model function based on a simulation of the wind energy plant, which model function is dependent on the environmental parameter(s) and/or operational parameter(s), wherein, particularly in the simulation, simulated vibration measurement data are generated. By way of example, these simulated vibration measurement data can be generated with a sampling rate which corresponds to a sampling rate used in reality in order to make the simulation as true to reality as possible. Such a simulation can already model the dependence of the natural frequency (frequencies) on environmental and operational parameters well. For practical use, the function, which is based on the simulation, can either be used directly or, if it emerges that the actual natural frequencies systematically deviate from those of the simulation, it is possible to introduce corresponding systematic corrections and correction terms.

As an alternative to this, provision is likewise advantageously made for the at least one natural frequency expected value to be calculated on the basis of real measurement data of the real wind energy plant to be monitored for vibrations of the at least one rotor blade under regular operating conditions. In this case, further corrections are usually unnecessary.

Preferably, the at least one natural frequency expected value is calculated as a result of at least one fit function, in particular according to the least-squares method, in relation to the simulated or real measurement data for vibrations of the at least one rotor blade, wherein the fit function of the natural frequency in particular depends linearly on the environmental parameter(s) and/or operational parameter(s). Alternatively, in the case of the blade adjustment angle, use can advantageously also be made of a sine function or a cosine function.

A dedicated fit function is used for each monitored natural frequency. The respective fit function is based on real or simulated vibration measurement data of the rotor blade or the rotor blades of the wind energy plant during regular operation without faults being reported. Since dependencies on environmental parameters and operational parameters to a good approximation can be approximated linearly, a particularly simple implementation of the method without much computational outlay is provided. Here, the least-squares method is also, in particular, referred to as a multiple regression. If the fit function only has linear dependencies, this is a linear regression which occurs during the preliminary stages of the monitoring. This means during operation that a very simple fit function with the likewise measured environmental parameters and/or operational parameters is used during monitoring in each case for each current measurement value for the natural frequency or natural frequencies and therefore an expected value for the natural frequency is determined in a very simple manner.

Particularly in the case where the vibrations directly measured at the real wind energy plant or at the rotor blades are intended to be the basis for the at least one fit function, provision is preferably made for the at least one fit function to be adapted, in particular automatically, to an individual turbine configuration in a learning phase. This may take place at the start of the service life or the operation of a wind energy plant, but also in any case where the configuration of the wind energy plant changes, for example as a result of repairing or exchanging rotor blades or other vibration-relevant components.

Likewise preferably, the at least one fit function is improved during ongoing operation by further measurements under regular operating conditions. This means that the data pool, on the basis of which the at least one fit function or the fit parameters or regression parameters thereof is or are calculated, is increased and, in particular, extended to relatively large ranges of environmental parameters and operational parameters such that even more reliable modeling of the real vibration behavior of the rotor blade or rotor blades is made possible. The confidence intervals or the confidence interval are or is also improved further by increasing the statistics.

Preferably, the at least one confidence interval is also calculated as a function of the environmental parameter or parameters and/or operational parameter or parameters.

The first blade pitch frequency is preferably established as natural frequency. This is the vibration frequency in respect of the pivot movement of the blade within the rotor plane. It is particularly sensitive to changes in the configuration, for example material fatigue or irregular operational states such as e.g. ice accretion on the rotor blade. Moreover, a particularly clear signal is usually found for this vibration frequency in the frequency spectrum. Other likewise clear signals are usually found at the first natural frequency in the impact direction and at the second natural frequency in the rotational and impact direction.

The object underlying the invention is also achieved by an operational control apparatus of a wind energy plant comprising a tower, a nacelle arranged on the tower and a rotor, which has at least one blade angle adjustable rotor blade, at least one measuring device, which is embodied and arranged for registering rotor blade vibrations of the at least one rotor blade during the operation of the wind energy plant, wherein the operational control apparatus is configured and/or embodied for establishing at least one current natural frequency of the at least one rotor blade from the registered rotor blade vibrations and for additionally processing at least one environmental parameter and/or at least one operational parameter, which parameter or parameters influences or influence the natural frequency of the at least one rotor blade, which operational control apparatus is developed in that the operational control apparatus is additionally configured and/or embodied to calculate at least one natural frequency expected value dependent on the additionally registered environmental parameter(s) and/or operational parameter(s) and at least one confidence interval for the at least one established current natural frequency of the at least one rotor blade and to monitor whether the at least one established current natural frequency lies within, or outside of, the at least one confidence interval around the at least one natural frequency expected value.

In particular, the operational control apparatus is preferably configured and/or embodied to carry out a method according to the invention as described above. As a result, the features and advantages mentioned for the method also apply to the operational control machine.

Finally, the object underlying the invention is also achieved by a wind energy plant comprising a tower, a nacelle arranged on the tower and a rotor, which has at least one blade angle adjustable rotor blade, at least one measuring device, which is arranged and embodied to register rotor blade vibrations of the at least one rotor blade during the operation of the wind energy plant and an operational control apparatus according to the invention as described above.

As a result, the method according to the invention is implemented in the present operational control apparatus of the wind energy plant and the need for an additional monitoring system becomes superfluous.

The features, properties and advantages specified in relation to the individual invention subjects, i.e. the method, the operational control machine and the wind energy plant, also apply without any restrictions to the other invention subjects, which relate to one another.

Further features of the invention will become clear from the description of embodiments according to the invention in conjunction with the claims and the attached drawings. Embodiments according to the invention can satisfy individual features or a combination of a plurality of features.

BRIEF DESCRIPTION OF THE DRAWINGS

Without restricting the scope of the general inventive concept, the invention will be described below on the basis of exemplary embodiments, with reference being made to the drawings, wherein reference is explicitly made to the drawings in respect of all details according to the invention that are not explained in any more detail in the text. In detail.

In the drawings, similar or like elements and/or parts are respectively provided with the same reference signs, and so a renewed presentation is dispensed with in each case.

DETAILED DESCRIPTION OF THE INVENTION

Figure 1:
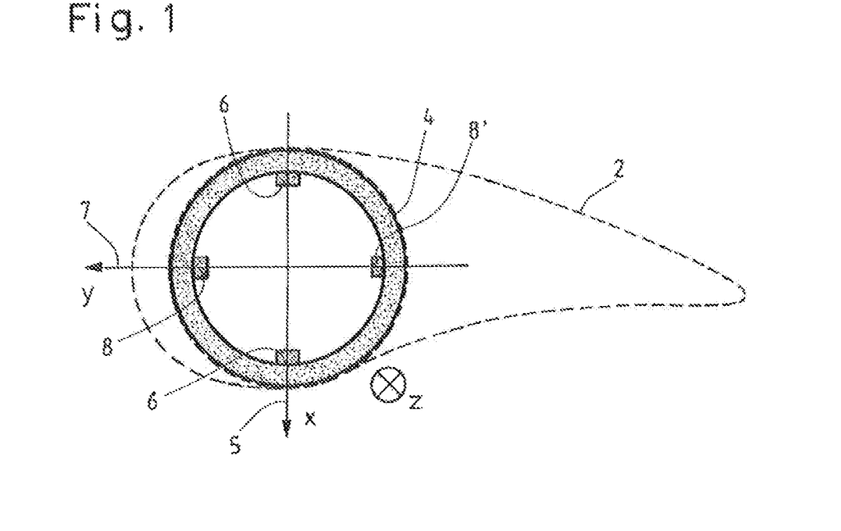
FIG. 1 shows a schematic cross-sectional illustration of a rotor blade.

FIG. 1 schematically illustrates a cross section of a rotor blade 2. A profile contour in a central section is depicted using dashed lines. The rotor blade root 4 is depicted as a solid circle. A coordinate system has been plotted, wherein the x-axis points in the impact direction 5 from the suction side to the pressure side, whereas the y-axis points in the rotational direction 7 to the front edge of the profile. The z-axis points into the plane of the drawing toward the blade tip (not depicted here).

Four strain sensors 6, 6', 8, 8' are attached in the inner circumference of the rotor blade root 4, respectively two strain sensors 6, 6' in the impact direction 5 and two strain sensors 8, 8', in the rotational direction 7. Therefore, in general, one sensor of a sensor pair 6, 6' and 8, 8', respectively, is compressed and the other sensor is stretched when the rotor blade is bent. By way of example, the strain sensors 6, 6', 8, 8' can be fiber Bragg grating sensors.

Figure 2:
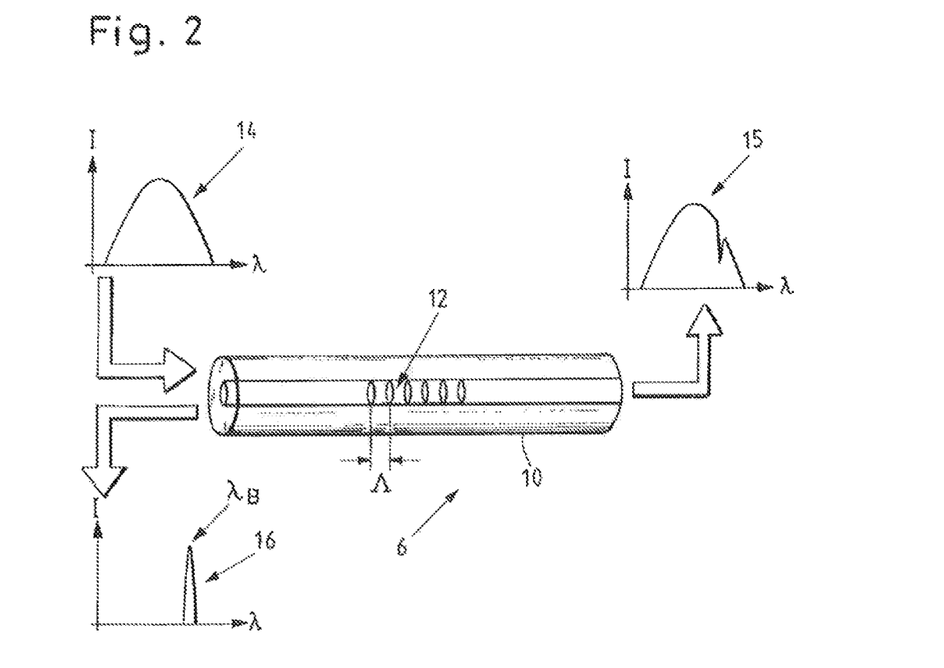
FIG. 2 shows a schematic diagram of the functionality of a fiber Bragg grating sensor.

FIG. 2 depicts the principle of the functionality of a strain sensor 6 based on the basis of a fiber Bragg grating 12 in an exemplary manner. The strain sensor 6 comprises an optical waveguide 10, in the core of which a fiber Bragg grating with periodically alternating refractive index is impressed in a region. The grating period or the distance between two similar regions is $\Lambda$.

When a broad light spectrum 14 is coupled into the optical waveguide 10 from one side, a majority of the light spectrum is transmitted. However, due to the periodicity of the fiber Bragg grating, a narrowband part with the Bragg wavelength $\lambda_B$ of the light spectrum is reflected such that the reflected light spectrum 16 only contains this Bragg wavelength $\lambda_B$. By contrast, the transmitted light spectrum 15 is lacking precisely this reflected component at $\lambda_B$ in relation to the coupled-in light spectrum 14.

If the optical waveguide 10 is stretched or compressed by a mechanical load, there is a change in the periodicity $\Lambda$ of the fiber Bragg grating and the Bragg wavelength $\lambda_B$ changes accordingly. The wavelength of the reflected light therefore provides information about the stretch or compression of the optical waveguide 10. The ongoing changes in the reflected wavelength therefore also are a measure for the vibrations of the rotor blade 2 in which the fiber Bragg grating sensors are arranged.

Systematic drifts of the Bragg wavelength $\lambda_B$, for example as a result of changes in temperature of the sensors, can be eliminated by virtue of identical fiber Bragg grating sensors being arranged at an angle, or in an unloaded manner, in a tube, which sensors are therefore exposed to the same changes in temperature but not loaded by rotor blade vibrations.

Figure 3:
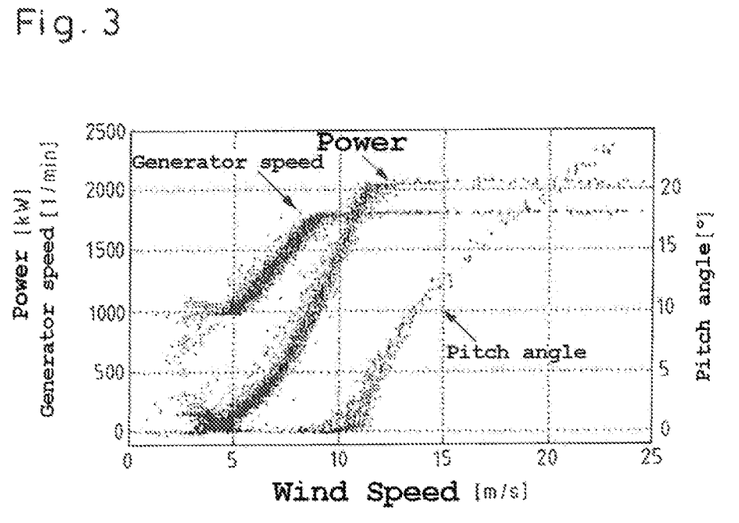
FIG. 3 shows distributions of the generator speed, pitch angle and power of a wind energy plant against mean wind speed.

FIG. 3 shows the dependence of generator speed, power and pitch angle, i.e. rotor blade adjustment angle, on the prevalent wind speed for a MM92-type wind energy plant by the applicant. Each data point represents averaging over a specific measurement duration of a plurality of minutes, as a result of which there respectively is a relatively broad scattering of the data points as a result of the variations in the operating conditions that occur within the measurement duration. The thicker data points are based on a simple simulation of the wind energy plant.

It is possible to see that, at low wind speeds, it is initially only the generator speed that increases with the wind speed. This relates to the so-called partial load range, in which the nominal power of the wind energy plant has not yet been reached. After a generator rated speed has been reached, the blade angle adjustment is used for regulating the power in the case where there is a further increase in the wind speed. This already sets in before reaching the nominal power of the wind energy plant.

Figure 4:
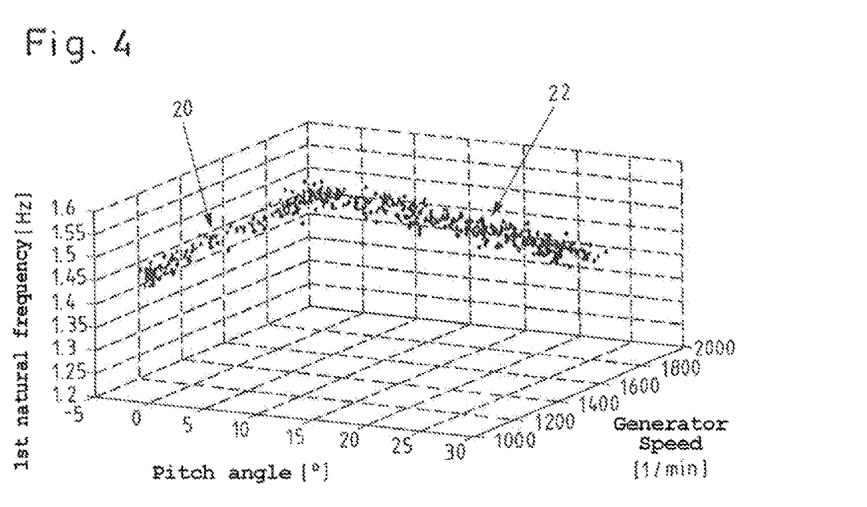
FIG. 4 shows an illustration of the first natural frequency of a rotor blade as a function of pitch angle and generator speed.

FIG. 4 depicts the results of a simulation of the wind energy plant, wherein, for reasons of clarity, only simulated measurement values for the first natural frequency or fundamental frequency in the rotational direction of the rotor blade are plotted against the blade adjustment angle (pitch angle) and generator speed. This results in a substantially V-shaped distribution, wherein one limb 20 of the V represents the weak wind operation at a constant blade adjustment angle in the 0°-position and in the case of a variable generator speed, and the other limb 22 represents the operation at relatively strong wind with a constant generator rated speed at variable blade adjustment angles. The simulated measurement values show an increase in the first natural frequency with increasing generator speed and a reduction therein with increasing blade adjustment angle. In the shown range, the dependencies are linear to a good approximation. Similar dependencies emerge, for example, with temperature, the measured wind speed and the power.

If there were a change in the vibration properties of the rotor blade, for example as a result of ice accretion or breaks in the material, there would be a shift in the natural frequency; in particular, the first natural frequency in the rotational direction would reduce due to the increased mass in the case of ice accretion. If this change is significant in view of the broad scattering of the data and the measurement accuracy, this can be used, for example, for an ice warning. It is also possible to define different limit values or confidence intervals for, firstly, an ice warning and, secondly, power reduction or shut down of the wind energy plant.

Figure 5:
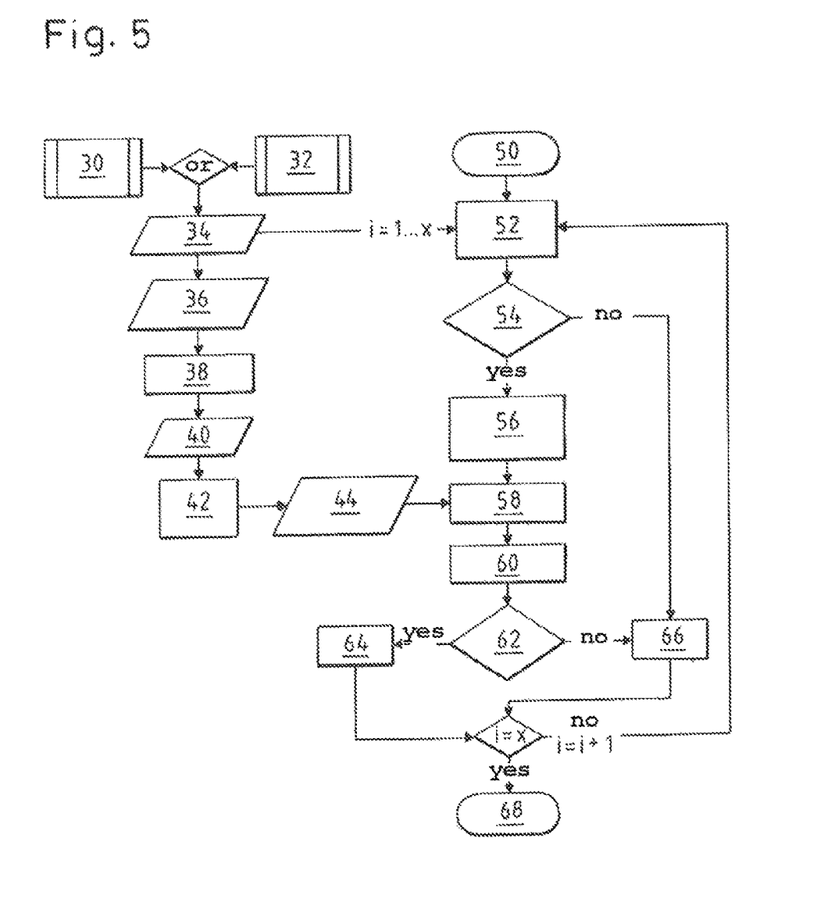
FIG. 5 shows a schematic flowchart of an exemplary embodiment of a method according to the invention.

FIG. 5 depicts a schematic sequence of an exemplary embodiment of a method according to the invention. The depicted exemplary embodiment comprises two parts, namely initially a part in which the function which is used for generating the natural frequency expected value and optionally the confidence interval is established and furthermore a part in which there is ongoing monitoring of the operation of the wind energy plant, for example in respect of ice accretion on the rotor blade.

In the first part of the method, measurement data 34 in respect of e.g. the first natural frequency of the rotor blade in the rotational direction are established or gathered, either from a real wind energy plant 30 or from a simulation 32. Measurement data or simulated data in relation to the surrounding temperature, wind speed, generated power, generator speed, rotor speed and/or blade adjustment angle are also assigned to these measurement data 34. Subsequently, a sample 36, for which it is known that regular operating conditions prevailed in each case and which covers the largest possible range of the occurring environmental and/or operational parameters, can be selected from the measurement data 34. In step 38, a reference data record 40 is generated from the sample 36, which reference data record comprises the measurement data of the sample 36 with all co-registered environmental and/or operational parameters in an ordered form.

A linear regression or else a least-squares fit 42 is applied to the reference data record 40 in order to establish regression coefficients 44 for a fit function which, for example, may have a linear or square dependence on one or more environmental and/or operational parameters. It is also possible to select a mixed form, in which e.g. the dependence of the first natural frequency on the generator or rotor speed and temperature is taken into account in a linear fashion and the dependence on the blade angle is taken into account in a quadratic fashion. As a result of the multiplicity of measurement values, the system of equations to be optimized will be greatly over-determined and an ideal solution for all fit parameters will be found. The confidence interval can also be reliably determined with the aid of the linear regression. The fit function determined thus supplies the expected value of the first natural frequency for each current operational state in relation to surrounding temperature, speed, blade angle, etc.

The second part of the exemplary embodiment in FIG. 5 relates to monitoring. By way of example, an ice identification is started 50 and current measurement values from the operation of the wind energy plant are read 52. These measurement values relate to the surroundings and/or operational parameters such as temperature, wind speed, blade angle, power and/or speed, as well as the vibration signals of the rotor blade or blades registered on an ongoing basis by the vibration, acceleration or strain sensors.

For ice identification, there is a case differentiation 54 in relation to the surrounding temperature. If the latter is greater than a limit value from a preferred interval of 0° C. to 5° C., in particular 3° C., ice formation is unlikely and no ice report is produced. However, if the surrounding temperature is not greater than 3° C., said method proceeds with further steps 56 to 62. Here, the first natural frequency in the rotational direction of the rotor blade is initially established from the temporal vibration data within the scope of a Fast Fourier Transform (FFT) 56. It is also possible to establish other natural frequencies, for example the first natural frequency in the impact direction of the rotor blade and/or optionally the second natural frequency, if this serves ice identification and if appropriate expected value functions were generated for this.

In step 58, the expected value or the expected values for the monitored natural frequency or natural frequencies is/are calculated for the current environmental and/or operational conditions from the selected fit function and the regression coefficient, 44 determined previously, as is the corresponding confidence interval 60 as well. In the case differentiation 62, a test is subsequently carried out as to whether the previously established natural frequency or the previously established natural frequencies lies or lie outside of the (respective) confidence interval around the (respective) expected value. If this is not the case, no ice report is output 66 in turn; however, if this is the case, an ice report is output 64. Subsequently, the second part of the method starts in the next iteration unless an exit condition is satisfied and the ice identification is completed 68.

The query 62 can be defined as "greater than" or as "greater than or equal to", or else as "less than" or "less than or equal to" in order to test whether an established natural frequency lies within or outside of the confidence interval.

In the described method, the monitored natural frequencies usually lie in the range below 10 Hz or likewise preferably up to 100 Hz. Therefore, it is generally sufficient to sample the vibrations of the rotor blades with a sampling rate of 20 Hz, preferably up to 50 Hz, or likewise preferably up to 100 Hz or, in particular, up to 200 Hz. In order to obtain a high measurement accuracy for the monitored natural frequency or natural frequencies within the scope of an FFT, the number of samples should be of the order of 1000. This is therefore fulfilled within a measurement time of approximately 10 to 50 seconds. It is also possible to monitor an ongoing sample of measurements, in which, during each individual measurement, the respectively last e.g. 1024 or 2048 measurements are used for the FFT. An FFT on e.g. 500 to 1000 measurement points plus peak value establishment in the frequency spectrum in order to establish the natural frequency or natural frequencies takes significantly less than $\frac{1}{50}$ second using currently employed data processing machines and this is therefore also implementable in an operational control apparatus of a wind energy plant.

In the following, a calculation of a fit function for a natural frequency expected value is explained in an exemplary manner. By way of example, the natural frequency which, for example, depends linearly on the generator speed, the pitch angle and the temperature can be described by the following model function:

$$F(\theta_m, \omega_m, T_m) = A \cdot \theta_m + B \cdot \omega_m + C \cdot T_m + D$$

where F is the linear model function with a unit of [Hz], A, B, C and D are the regression coefficients of the function, $\theta_m$ is the mean pitch angle during the measurement duration in [°], $\omega_m$ is the mean generator speed during the measurement duration for a measurement point [1/min] and $T_m$ is a mean temperature in [° C.]. Here, the measurement duration relates to the duration in which the e.g. 1000 samples were collected for the FFT.

Initially, a reference data record is generated from the available measurement data. Said reference data record contains the measurement values for the mean blade adjustment angle or pitch angle, the mean generator speed and the mean temperature for the aforementioned measurement duration. Additionally, the calculated first and second natural frequencies are assigned to these values. Proceeding from the reference data record, the coefficients A, B, C and D of the model function are established in the next step for one of these natural frequencies. Since this is a linear function of a plurality of independent variables, a multiple linear regression is carried out.

In a general form, the model function can be written as:

$$y_i = x_{i1}b_1 + x_{i2}b_2 + x_{i3}b_3 + b_4 \text{ with } i=1,\ldots,n,$$

where n is the extent of the sample and may comprise several hundred to several thousand measurement values and $b_1$ to $b_n$ are the regression parameters A to D.

It is expedient to consider the model function using the matrix notation. Here, lowercase letters represent vectors and uppercase letters represent matrices. Therefore:

$$y = Xb + e$$

applies, where the vector $e=(e_1, e_2, e_3, e_4)$ is an error term. Using matrix notation, the aforementioned equation is:

$$\begin{pmatrix} y_1 \\ y_2 \\ \vdots \\ y_n \end{pmatrix} = \begin{pmatrix} x_{11} & x_{12} & \cdots & x_{1k} \\ x_{21} & x_{22} & \cdots & x_{2k} \\ \vdots & \vdots & \ddots & \vdots \\ x_{n1} & x_{n2} & \cdots & x_{nk} \end{pmatrix} \begin{pmatrix} b_1 \\ b_2 \\ \vdots \\ b_k \end{pmatrix} + \begin{pmatrix} e_1 \\ e_2 \\ \vdots \\ e_n \end{pmatrix}.$$

In the present case, k=4 and $x_{i4}=1$ for all i. With the aid of a multiple regression, the coefficients $b_1$ to $b_4$ can be determined in such a way that the model function approximates the measurement data of the reference data record to the best possible extent. The deviations $e_i$ of the model function from the actual measurement values are referred to as residuals. These are minimized with the least-squares method ("least-squares fit") such that $$\sum_{i=1}^{n} e_i^2 = e'e = (e_1 \ e_2 \ \cdots \ e_n) \begin{pmatrix} e_1 \\ e_2 \\ \vdots \\ e_n \end{pmatrix}$$

is minimized. With e=y−Xb, the sum of squares of the residuals after some rearrangement emerges as:

$$e'e = y'y - 2b'X'y + b'X'Xb.$$

This sum of squares is minimized by virtue of the expression being partially differentiated with respect to b and set equal to zero:

$$\min_b(e'e) = \frac{\partial(e'e)}{\partial b} = -2X'y + 2X'Xb \stackrel{!}{=} 0$$

$$X'Xb = X'y$$

Thus, an estimate which minimizes the square errors emerges for the coefficients b. The coefficients are determined as $b=(XX)^{-1}X'y$.

Now, it is possible with the aid of the model function to calculate an expected value of the regression $\hat{y}_{regress}$ for the first or second natural frequency for any x-value:

$$\hat{y}_{regress} = y = Xb + e.$$

In general, the expected value μ in the statistics denotes the value which a random variable assumes on average. Since the underlying population is often unknown or infinitely large and it is therefore impossible to determine μ, the expected value is approximated by the arithmetic mean $\bar{x}$ of a sample:

$$\bar{x} = \frac{1}{n}\sum_{i=1}^{n} x_i$$

The empirical standard deviation s lends itself to obtain a measure for the distribution of the sample values about the mean value thereof:

$$s = \sqrt{\frac{1}{n-1}\sum_{i=1}^{n}(x_i - \bar{x})^2}.$$

As the size of the sample increases, the arithmetic mean $\bar{x}$ converges to the expected value μ. The same applies to the empirical standard deviation s, which approaches the standard deviation σ of the population with increasing sample size. If a normal distribution of the sample measurement values x is assumed, it is possible, with the aid of the standard deviation, to specify the probability P with which a measurement value occurs within an interval around the expected value. This region is also referred to as a confidence interval. In the case of e.g. a probability of 99%, the boundaries of this confidence interval are:

$$\mu - u_{99}\cdot\sigma < X < \mu + u_{99}\cdot\sigma.$$

The value of $u_{99}$ can be gathered from tables of the normal distribution. For a confidence interval of 99%, $u_{99}=2.58$.

What is intended to be shown below is how the distribution of the regression is determined. The standard error can be calculated for the multiple regression. Proceeding from the variance of the sample residuals $$\tilde{s}_e^2 = \frac{1}{n}\sum_{i=1}^{n} e_i^2 = \frac{e'e}{n}$$

an unbiased estimator for the variance of the population is determined by virtue of the variance of the sample residuals being corrected by the factor n/(n−k), where n is the number of observations and k is the number of degrees of freedom, with k=4 in the exemplary case. The square root of the corrected variance provides the standard error of the regression $$\hat{s}_{regress} = \sqrt{\frac{e'e}{n-k}}.$$

In the case of a sufficiently large sample size, $\hat{y}_{regress}$ approaches the expected value μ of the population and $\hat{s}_{regress}$ approaches the standard deviation σ of the population. To a good approximation, this can be assumed for a sample size of n>500. Therefore, it is possible from the multiple regression to specify a confidence interval within which the actual measurement data $y_{real}$ will lie. If a normal distribution of the measurement values is assumed, this means that the following applies with a probability of 99%:

$$\hat{y}_{regress} - 2.58\cdot\hat{s}_{regress} < y_{real} < \hat{y}_{regress} + 2.58\cdot\hat{s}_{regress}.$$

In the exemplary embodiment according to the invention, these circumstances are employed for identifying ice. The concept underlying the developed method is that ice at the rotor blades leads to a mass increase, which becomes noticeable by way of a reduction in the first (and second) natural frequency. The expected value μ is determined for a specific operating point by way of the model function. Subsequently, the actual measurement values for the first and optionally the second natural frequency are compared to the respective expected value. If the measurement value for the first natural frequency is, or if both measurement values are, less than the lower limit of the respective confidence interval around the expected value, ice on the rotor blade can be assumed with a high probability. A constraint put into place is that the mean temperature is less than 3° C. The probability of an error in the case of significant deviation then is at most 0.5%.

All specified features, including the features to be gathered from the drawings alone as well as individual features which are disclosed in combination with other features, are considered to be essential to the invention, both on their own and in combination. Embodiments according to the invention can be satisfied by individual features or a combination of a plurality of features.

LIST OF REFERENCE SIGNS APPEARING IN DRAWING FIGURES

2 Rotor blade
4 Rotor blade root
5 Impact direction
6, 6' Strain sensor in the impact direction
7 Rotational direction
8, 8' Strain sensor in the rotational direction
10 Optical waveguide
12 Fiber Bragg grating
14 Coupled-in light spectrum
15 Transmitted light spectrum
16 Reflected light spectrum
20 Partial load range
22 Full load range
30 Real machine
32 Simulation
34 Measurement data
36 Sample of measurement data
38 Generating a reference data record
40 Reference data record
42 Performing a multiple regression
44 Regression coefficients
50 Starting the ice identification
52 Reading measurement values
54 Case differentiation: temperature >3° C.
56 FFT, determining the 1st (and 2nd) natural frequency
58 Calculating the expected value
60 Calculating the confidence interval
62 Case differentiation: significant deviation?
64 Ice report
66 No ice report
68 End of the ice identification
$\lambda_B$ Bragg wavelength
$\wedge$ Period of the fiber Bragg grating

What is claimed is:

1. A method for monitoring operation of a wind energy plant that includes a tower, a nacelle arranged on the tower and a rotor having at least one blade angle adjustable rotor blade, wherein rotor blade vibrations of the at least one rotor blade are registered during the operation of the wind energy plant and at least one current natural frequency of the at least one rotor blade is established from the registered rotor blade vibrations, and wherein at least three parameters are registered that influence the at least one established current natural frequency of the at least one rotor blade, said at least three parameters registered being (1) temperature, (2) at least one parameter selected from rotor speed, generator speed and wind speed, and (3) at least one parameter selected from rotor blade angle and generated power, the method comprising:
calculating
at least one natural frequency expected value of the at least one rotor blade dependent on the at least three parameters registered, and
at least one confidence interval for the at least one natural frequency expected value of the at least one rotor blade;
monitoring whether the at least one established current natural frequency lies within, or outside of, the at least one confidence interval for the at least one natural frequency expected value; and
putting the wind energy plan into operation with reduced power or shutting down the wind energy plant when the established current natural frequency is determined in the monitoring step to lie outside of the at least one confidence interval for the at least one natural frequency expected value;
wherein the at least one natural frequency expected value is calculated as a result of at least one fit function in relation to
(A) simulated vibrational measurement data from a model of the wind energy plant dependent on the at least three parameters registered, or
(B) real measurement data of vibrations from the at least one rotor blade under regular operating conditions.

2. The method as claimed in claim 1, wherein the vibrations of the at least one rotor blade are registered by a sensor system that is stationary in relation to the rotor.

3. The method according to claim 2, wherein the sensor system is stationary in relation to the at least one rotor blade.

4. The method according to claim 2, wherein the sensor system comprises acceleration sensors, deformation sensors and/or strain sensors.

5. The method as claimed in claim 1, wherein a function underlying the at least one natural frequency expected value is adaptable to a current turbine configuration by statistical evaluation of measurement data.

6. The method as claimed in claim 1, wherein the at least one depends linearly on the at least three parameters registered.

7. The method according to claim 6, wherein the at least one fit function is a least-squares method.

8. The method as claimed in claim 6, wherein the at least one fit function is adapted to an individual turbine configuration in a learning phase.

9. The method as claimed in claim 6, wherein the at least one fit function is adapted automatically to an individual turbine configuration in a learning phase.

10. The method as claimed in claim 6, wherein the at least one fit function is improved during ongoing operation by further real measurement data under regular operating conditions.

11. The method as claimed in claim 1, wherein the at least one confidence interval is also calculated as a function of the at least three parameters registered.

12. The method as claimed in claim 1, wherein a first blade pitch frequency is established as the natural frequency.

13. An operational control apparatus for use with a wind energy plant that includes a tower, a nacelle arranged on the tower and a rotor having at least one blade angle adjustable rotor blade, and which is configured to register rotor blade vibrations of the at least one rotor blade during operation of the wind energy plant and register at least three parameters that influence the at least one established current natural frequency of the at least one rotor blade, said at least three parameters registered being (1) temperature, (2) at least one parameter selected from rotor speed, generator speed and wind speed, and (3) at least one parameter selected from rotor blade angle and generated power, said operational control apparatus comprising an Operation Control System configured to:

establish at least one current natural frequency of the at least one rotor blade from the registered rotor blade vibrations:

calculate at least one natural frequency expected value dependent on the at least three parameters registered and at least one confidence interval for at least one natural frequency expected value of the at least one rotor blade;

monitor whether the at least one established current natural frequency lies within, or outside of, the at least one confidence interval for the at least one natural frequency expected value, and     put the wind energy plant into operation with reduced power or shuts down the wind energy plant when the established current natural frequency lies outside of the confidence interval for the natural frequency expected value;

wherein the at least one natural frequency expected value is calculated as a result of at least one fit function in relation to (A) simulated vibrational measurement data from a model of the wind energy plant dependent on the at least three parameters registered, or (B) real measurement data of vibrations from the at least one rotor blade under regular operating conditions.

14. The wind energy plant for use with the operational control apparatus according to claim 13 comprising the tower, the nacelle arranged on the tower, the rotor having the at least one blade angle adjustable rotor blade and which is configured to register the rotor blade vibrations of the said at least one rotor blade during the operation of the wind energy plant and to register at least three parameters that influence the at least one established current natural frequency of the at least one rotor blade, said at least three parameters registered being (1) temperature, (2) at least one parameter selected from rotor speed, generator speed and wind speed, and (3) at least one parameter selected from rotor blade angle and generated power.

* * * * *

UNITED STATES PATENT AND TRADEMARK OFFICE
CERTIFICATE OF CORRECTION

PATENT NO.        : 10,145,360 B2
APPLICATION NO.   : 14/822372
DATED             : December 4, 2018
INVENTOR(S)       : Bertin Kramer

Page 1 of 1

It is certified that error appears in the above-identified patent and that said Letters Patent is hereby corrected as shown below:

In the Claims

In Column 14, Line 47, Claim 6, -- Insert --fit function-- between the words "one" and "depends" --

Signed and Sealed this
Nineteenth Day of February, 2019

Andrei Iancu
*Director of the United States Patent and Trademark Office*